United States Patent [19]

Tanaka et al.

[11] 4,393,840
[45] Jul. 19, 1983

[54] FUEL CONTROL SYSTEM FOR AUTOMOBILE ENGINE

[75] Inventors: Hideki Tanaka; Kazutoshi Otsuka, both of Hiroshima, Japan

[73] Assignee: Tokyo Kogyo Co., Ltd., Hiroshima, Japan

[21] Appl. No.: 182,405

[22] Filed: Aug. 26, 1980

[30] Foreign Application Priority Data

Aug. 31, 1979 [JP] Japan .................. 54/112252

[51] Int. Cl.³ .................. F02B 33/00; F02M 17/00
[52] U.S. Cl. .................. 123/440; 123/179 G; 123/568; 123/571
[58] Field of Search ............ 123/440, 568, 571, 179 G

[56] References Cited

U.S. PATENT DOCUMENTS

| 4,088,095 | 5/1978 | Aono | 123/32 EE |
| 4,166,437 | 9/1979 | Bianchi | 123/571 |
| 4,249,374 | 2/1981 | Sugasawa | 123/568 |

FOREIGN PATENT DOCUMENTS

| 51-102721 | 9/1976 | Japan | 123/440 |
| 51-102721 | 9/1976 | Japan | 123/440 |

*Primary Examiner*—Ronald B. Cox
*Attorney, Agent, or Firm*—Wenderoth, Lind & Ponack

[57] ABSTRACT

An automobile fuel control system for an automobile internal combustion engine includes a composition sensor for detecting the concentration of oxygen contained in the exhaust gases emitted from the engine, a mixing ratio control including a compensator for compensating for variations of the mixing ratio of the combustible air-fuel mixture being supplied to the engine, a temperature detector for detecting the temperature of the engine and for generating a first signal indicative of a first predetermined engine temperature and for generating a second signal indicative of a second predetermined engine temperature higher than the first predetermined engine temperature, and an exhaust gas recirculating system including an electromagnetically operated valve for selectively establishing and interrupting the communication between the exhaust passage and the fuel intake passage. The valve is operable in response to the generation of the first signal to establish the communication between the exhaust and intake passages while the ratio control generates an output pulse to the compensator in response to the generation of the second signal to adjust the mixing ratio to a value substantially equal to the stoichiometric value required for a three-way catalytic converter to work at its maximum conversion efficiency.

6 Claims, 2 Drawing Figures

FUEL CONTROL SYSTEM FOR AUTOMOBILE ENGINE

BACKGROUND OF THE INVENTION

The present invention generally relates to a fuel control system for an automobile internal combustion engine having an exhaust gas recirculating (EGR) system and an air-fuel mixture control. More particularly, the present invention relates to an automobile fuel control system for controlling in sequence the EGR system and the air-fuel mixture control in accordance with the engine temperature and in dependence on the composition of the exhaust gases emitted from the engine for the purpose of minimizing pollutants of the exhaust gases.

There is known an automobile fuel control system which comprises an exhaust composition sensor disposed on the exhaust system of the engine for sensing the oxygen concentration in exhaust gases emitted from the engine, and an air-fuel mixture control including a mixing ratio compensator, said air-fuel mixture control being operable in response to an output signal from the composition sensor for causing the compensator to adjust the mixing ratio of the combustible air-fuel mixture being supplied to the engine to a value substantially equal to the stoichiometric air-fuel mixing ratio required for a three-way catalytic converter on the exhaust system to work at its maximum conversion efficiency, that is, to minimize not only CO and HC components but also NOx components of the exhaust gases. An example of this is disclosed in, for example, the U.S. Pat. No. 4,088,095, patented on May 9, 1978. However, this patent is silent as to not only the use of a temperature sensor for sensing the temperature of the engine and the operative association of such temperature sensor with the air-fuel mixture control, but also the use of the EGR system in combination with the air-fuel mixture control.

The Japanese Laid-open Patent Publication No. 51-102721 laid open to public inspection on Sept. 10, 1976, discloses a similar automobile fuel control system utilizing the EGR control in combination with the air-fuel mixture control. According to this Japanese publication, the exhaust composition sensor is electrically connected to the air-fuel mixture control including an actuator through a difference detector. A temperature sensor for generating an output signal indicative of the engine temperature is electrically connected to the difference detector and also to the EGR control which includes a solenoid operated valve. The difference detector is so designed as to generate an output signal indicative of the difference between the output signal from the composition sensor, which is indicative of the oxygen concentration in the exhaust gases, and a reference signal representative of a predetermined air-fuel mixing ratio of the combustible air-fuel mixture.

In this automobile fuel control system disclosed in the Japanese publication, when the engine temperature is low, such as during the cold start of the engine, the EGR control is held in position to cause the solenoid operated valve to interrupt the circulation of a portion of the exhaust gases back to the fuel intake system of the engine on one hand and the air-fuel mixture control is held in an inoperative position. However, as the engine is warmed up, the air-fuel mixture control is brought into operation and, at the same time, the EGR control is operated to cause the solenoid operated valve to initiate the circulation of a portion of the exhaust gases back to the fuel intake system of the engine. In this way, at the time the air-fuel mixture control and the EGR control are simultaneously operated, the air-fuel mixture being supplied to the engine is considerably leaned temporarily for a certain period of time, resulting in a fluctuation of the power output of the engine and/or reduction of the drivability of an automobile.

On the other hand, where the EGR control is operated in delayed relation to, that is, subsequent to, the operation of the air-fuel mixture control, it has been found that, since during the warm-up of the engine, not only does the engine requires an enriched air-fuel mixture, but also the catalytic converter has not yet been warmed to a temperature required for the catalyst in the catalytic converter to work, the amount of the NOx components of the exhaust gases inhibited by the catalytic converter from being discharged to the atmosphere is smaller than that inhibited by the circulation of the portion of the exhaust gases back to the engine fuel intake system even though the air-fuel mixture control has been operated and, in addition, a prolonged period of time is required to complete the warm-up of the engine. In this case, since the enriched air-fuel mixture is determined by the mixing ratio control, the control itself requires a complicated structure and, therefore, is expensive.

SUMMARY OF THE INVENTION

Accordingly, the present invention has been developed with a view of substantially eliminating the disadvantages and inconveniences inherent in the prior art automobile fuel control system and has for its essential object to provide an improved automobile fuel control system wherein the respective timings at which the air-fuel mixture control and the EGR control are operated are controlled according to the extent to which the automobile engine is warmed up.

Another important object of the present invention is to provide an improved automobile fuel control system of the type referred to above, which is simple in construction and can be manufactured without incurring any unreasonably increased manufacturing cost.

A further object of the present invention is to provide an improved automobile fuel control system of the type referred to above, which is reliable in operation and effective to minimize or substantially eliminate the emission of pollutants of the exhaust gases to the atmosphere.

In order to accomplish these and other objects of the present invention, the present invention employs an engine temperature detector capable of generating first and second temperature signals indicative of low and high temperatures, respectively, of the engine during and after the warm-up of the engine, the first temperature signal being utilized to bring the EGR control into operation to effect the circulation of a portion of the exhaust gases being emitted from the engine back to the engine fuel intake system and the second temperature signal being utilized to bring the air-fuel mixture control into operation to effect the supply of fresh air into the engine fuel intake system so as to adjust the mixing ratio of the air-fuel mixture being supplied to the engine.

According to the present invention, when the portion of the exhaust gases being emitted from the engine is circulated back to the engine fuel intake system during the operation of the EGR control which has been initated in response to the first temperature signal, the portion of the exhaust gases joins the air-fuel mixture which is then enriched by the action of the choke valve so that the emission of the NOx components of the exhaust gases can be minimized without the drivability of the automobile being adversely affected at the time of initiation of the exhaust gas recirculation. As the warm-up of the engine progresses, and when and after the second temperature signal has been generated by the engine temperature detector, the air-fuel mixture control is operated while the EGR control is still in operation, so that the air-fuel mixture being supplied to the engine can be controlled to a mixing ratio substantially equal to the stoichiometric value required for the catalytic converter to work at its maximum conversion efficiency, with no substantial possibility of reduction in drivability of the automobile which would otherwise occur at the time of initiation of the operation of the air-fuel mixture control.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
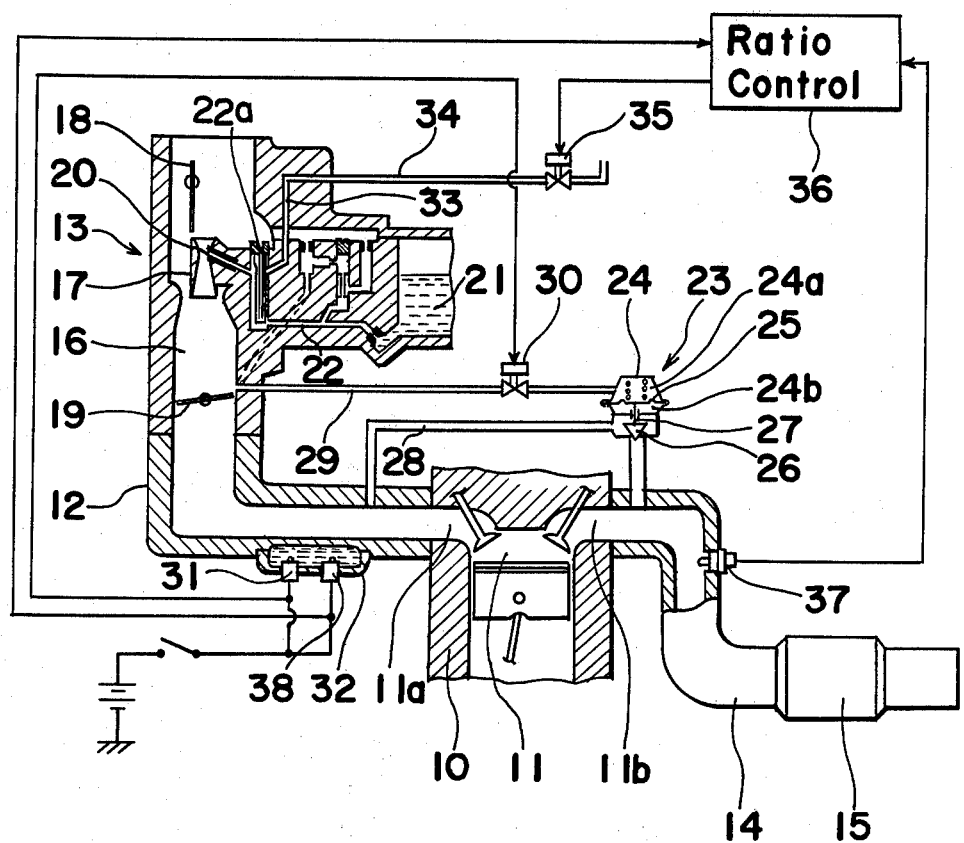
FIG. 1 is a schematic diagram showing an automobile internal combustion engine in sectional view with an automobile fuel control system of the present invention incorporated therein.

Referring to the accompanying drawings, there is shown an automobile internal combustion engine comprising a cylinder block 10 having at least one combustion chamber 11 defined therein. The combustion chamber 11 is communicated through an intake port 11a and then through an intake manifold 12 to a source of combustible air-fuel mixture, that is, a carburetor 13 on one hand and through an exhaust port 11b and then through an exhaust manifold 14 to the atmosphere. A catalytic converter, preferably a three-way catalytic converter 15, is disposed on the exhaust manifold 14 in a manner known to those skilled in the art.

The carburetor 13 is of any known construction and includes a fuel intake passage 16 having one end fluid-connected to the intake manifold 12 and the other end communicated to the atmosphere through an air cleaner (not shown), a venturi 17, a choke valve 18 positioned upstream of the venturi 17 with respect to the direction of flow of combustible air-fuel mixture towards the combustion chamber 11, a throttle valve 19 positioned on one side of the venturi 17 remote from the choke valve 18, a fuel nozzle 20 opening through the hollow of the venturi 17 into the fuel intake passage 16, a fuel bowl 21, and a main fuel supply passage 22 having one end communicated to the fuel bowl 21 and the other end communicated to the fuel nozzle 20 and connected main air bleed 22a.

An EGR system may also be of any known construction and includes an EGR control valve assembly 23 comprised of a valve casing 24 having a diaphragm member 25 which divides the interior of the casing 24 into negative and atmospheric chambers 24a and 24b, and a valving member 26 connected by means of a connecting rod 27 to the diaphragm member 25 for displacement together with said diaphragm member 25. The EGR system also includes a recirculating passage 28 having one end communicated to the intake manifold 12 and the other end communicated to a portion of the exhaust manifold 14 between the cylinder block 10 and the three-way catalytic converter 15, said valving member 26 of the EGR control valve assembly 23 being adapted to selectively closing and opening the recirculating passage 28 in a manner as will be described later, the rate of flow of the exhaust gases through the recirculation passage 28 being controlled thereby according to the position of the diaphragm member 25, that is, the magnitude of the negative pressure introduced into the negative chamber 24a.

The negative chamber 24a of the control valve assembly 23 is communicated by means of a connecting passage 29 to a portion of the fuel intake passage 16 upstream of the throttle valve 19 with respect to the direction of flow of the combustible air-fuel mixture towards the combustion chamber 11. The connecting passage 29 has an electromagnetically operated shut-off valve 30 installed thereon, which valve 30 is normally closed and is adapted to be opened when the temperature of the engine cooling liquid attains a value equal to or higher than a first predetermined temperature, for example, 40° C. For this purpose, the solenoid unit built in the electromagnetically operated shut-off valve 30 is electrically connected through a suitable switching circuit (not shown) to a first temperature sensor 31 which detects the temperature of a cooling liquid, as a parameter representative of the temperature of the engine, and generates a first temperature signal indicative of the engine temperature when the temperature of the cooling liquid becomes equal to or higher than the first predetermined temperature. The cooling liquid, the temperature of which is detected by the first temperature sensor 31, is the one flowing inside a water jacket 32 surrounding the intake manifold 12 so far illustrated.

The carburetor 13 also includes an auxiliary or compensative air supply passage 33 having one end communicated to a portion of the main fuel supply passage 22 adjacent the fuel nozzle 20 and the other end fluid-connected to a control air passage 34 which is in turn communicated to the atmosphere preferably through the air cleaner. The control air passage 34 has a flow control valve 35, for example, an electromagnetically operated valve, installed thereon for controlling the rate of flow of a fresh air towards the main fuel supply passage 22 so that a fuel ready to enter the fuel nozzle 20 can, prior to being introduced into the intake passage 16, be leaned in the admixture with the fresh air so introduced during the opening of the control valve 35. This control valve 35 constitutes a compensator for compensating for variations in the air-fuel mixing ratio of the combustible air-fuel mixture and is adapted to be controlled by an output signal generated from a mixing ratio control 36, said output signal from the mixing ratio control 36 being in the form of a pulse.

The ratio control 36 has a pair of input terminals, one of said input terminals thereof being electrically connected to an exhaust gas composition sensor 37 and the other of said input terminals thereof being electrically connected to a second temperature sensor 38.

The composition sensor 37 may be of any known construction disclosed in, for example, the U.S. Pat. No. 3,962,866 patented on June 15, 1976. So far illustrated, the composition sensor 37 is adapted to detect the oxygen concentration in the exhaust gases emitted from the engine and flowing through the exhaust manifold 14 and applies to the ratio control 36 an electrical output signal indicative of the oxygen concentration in the exhaust gases. It is, however, to be noted that, since the oxygen concentration in the exhaust gases varies from time to time depending on the engine operating condition, the potential of the output signal from the composition sensor 37 varies correspondingly.

The second temperature sensor 38 detects the temperature of the cooling liquid inside the water jacket 32 and generates a second temperature signal when the temperature of the cooling liquid becomes equal to or higher than a second predetermined temperature, for example, 55° C., which is higher than the first predetermined temperature.

The ratio control 36 comprises a comparator 36a capable of generating a difference signal indicative of the difference between the output signal from the composition sensor 37 and a reference signal representative of a reference value corresponding to the stoichiometric air-fuel mixing ratio, a proportionating circuit 36b connected in series with the comparator 36a for generating an output signal proportional to the difference signal, an integrator circuit 36c connected in series with the comparator 36a and in parallel to the proportionating circuit 36b for generating an output signal of a value corresponding to the difference signal which has been integrated thereby, an adder 36d connected in series with both of the circuits 36b and 36c for generating a ratio control signal corresponding to the sum of the output signals respectively from the circuits 36b and 36c, a duty ratio control circuit 36e connected in series with the adder 36d for controlling the duty ratio according to the ratio control signal, a trigger signal generator 36f connected to the duty ratio control circuit 36e for supplying trigger pulses to the duty ratio control circuit 36e, an actuator drive circuit 36g connected in series with the duty ratio control circuit 36e for generating an actuating pulse of a duration determined by the duty ratio of the output signal from the duty ratio control circuit 36e, and a switching circuit 36h connected to the solenoid unit built in the control valve 35 and adapted to allow the passage of the actuating pulse therethrough to the control valve 35 only when and after the second temperature signal has been applied thereto for establishing a communication between the control air passage 34 and the atmosphere. The ratio control 36 of the construction described above is so designed as to operate in the following manner.

The comparator 36a generates, upon receipt of the output signal from the composition sensor 37, a high level signal, when the output signal from the composition sensor 37 exceeds the reference value corresponding to the stoichiometric air-fuel mixing ratio, and a low level signal when the same is lower than the reference value, which high and low level signals are designated by the different signal. Accordingly, the difference signal which has been integrated by the integrator circuit 36c increases in level when the difference signal from the comparator 36a is a high level signal, but decreases in level when the difference signal from the comparator 36a is a low level signal. The time during which the difference signal is integrated in the integrator circuit 36c is determined by the integrating constant characteristic of the integrator circuit 36c, and, accordingly, the output signal from the integrator circuit 36c fluctuates from time to time depending on the time at which it is generated from the integrator circuit 36c.

The ratio control signal generated from the adder 36d in response to the integrated difference signal from the integrated circuit 36c and corresponding to the sum of the integrated difference signal and the output signal from the proportionating circuit 36b is of a nature capable of ultimately controlling the control valve 35 in such a manner that, when the air-fuel mixing ratio of the air-fuel mixture detected by the composition sensor 37 is low as compared with the stoichiometric ratio, the communication of the control air passage 34 to the atmosphere through the control valve 35 is established, but when the same is high as compared with the stoichiometric ratio, such communication is interrupted.

The duty ratio control circuit 36e operates in response to the ratio control signal to determine the duty ratio in dependence on the magnitude, that is, voltage, of the ratio control signal applied thereto at the same time of generation of a trigger signal from the trigger signal generator 36f, said duty ratio being determinative of the ratio of the time during which the control valve 35 is held in position to establish the communication between the atmosphere and the control air passage 34 relative to the time during which it is held in position to interrupt such communication. More specifically, in the event that the voltage of the ratio control signal indicative of the air-fuel mixing ratio of the air-fuel mixture detected by the composition sensor 37 is lower than the reference voltage corresponding to the stoichiometric mixing ratio, the control valve 35 is held in position to establish the communication between the atmosphere and the control air passage 34. The lower the voltage of the ratio control signal, the longer the time during which the fresh air flows into the control air passage 34 through the control valve 35. In such case, the duty ratio control circuit 36e increases the duty ratio to a value approximately equal to 100%.

On the other hand, in the event that the voltage of the ratio control signal indicative of the air-fuel mixing ratio of the air-fuel mixture detected by the composition sensor 37 is higher than the reference voltage corresponding to the stoichiometric mixing ratio, the control valve 35 is held in position to interrupt the communication between the atmosphere and the control air passage 34. The higher the voltage of the ratio control signal, the shorter the time during which the fresh air flows into the control air passage 34 through the control valve 35. In such case, the duty ratio control circuit 36e decreases the duty ratio to a value approximately equal to 0%.

In any event, the ratio control 36 described above may be of any known construction and is so designed that it generates an output pulse only when the second temperature signal is applied thereto from the second temperature sensor 38; the output pulse is generated in dependence upon the oxygen concentration in the exhaust gases flowing through the portion of the exhaust manifold 14 upstream of the catalytic converter 15, and the output pulse is of a pulse duration required to allow the supply of the fresh air into the main fuel passage 22 in an amount sufficient to render the combustible air-fuel mixture then flowing towards the combustion chamber 11 to be adjusted to an air-fuel mixing ratio substantially equal to the stoichiometric value. Specifically, in the illustrated embodiment, the lower the oxygen concentration in the exhaust gases, the larger the pulse duration of the output pulse from the ratio control 36.

While the fuel control system is constructed as hereinbefore described, it operates in the following manner.

During the cold start of the engine wherein the temperature of the cooling liquid inside the water jacket 32 is lower than the first predetermined temperature, neither the first temperature sensor 31 nor the second temperature sensor 38 generate an output signal and, accordingly, both the valves 30 and 35 are closed. In this condition, a relatively enriched air-fuel mixture, the mixing ratio of which having been determined by the opening degree of the choke valve 18, is supplied to the combustion chamber 11 and, at the same time, no circulation of a portion of the exhaust gases from the exhaust manifold 14 back to the intake manifold 12 takes place, thereby permitting both of the engine and the catalytic converter 15 to be warmed up smoothly and progressively.

When and after the temperature of the cooling liquid inside the water jacket 32 has subsequently attained the first predetermined temperature, the first temperature signal is applied from the first temperature sensor 31 to the electromagnetically operated valve 30 and, as a result thereof, the valve 30 is opened to allow the negative pressure developed inside the fuel intake passage 16 to be introduced into the negative chamber 24a of the control valve assembly 23 through the connecting passage 29. With the negative pressure so introduced into the negative chamber 24a of the control valve assembly 23, the diaphragm member 25 is displaced against a biasing force of a spring element inside the negative chamber 24a with the valving member 26 consequently opening the recirculation passage 28. In this way, the recirculation of the portion of the exhaust gases flowing through the portion of the exhaust manifold 14 upstream of the catalytic converter 15 back to the intake manifold 12 is initiated in response to the generation of the first temperature signal from the first temperature sensor 31.

It is to be noted that there is no possibility of reduction of the automobile drivability at the time of initiation of the exhaust gas recirculation because the combustible air-fuel mixture then being supplied to the combustion chamber 11 is relatively enriched as determined by the opening degree of the choke valve 18. Therefore, it is clear that the emission of NOx components of the exhaust gases can advantageously be minimized.

Figure 2:
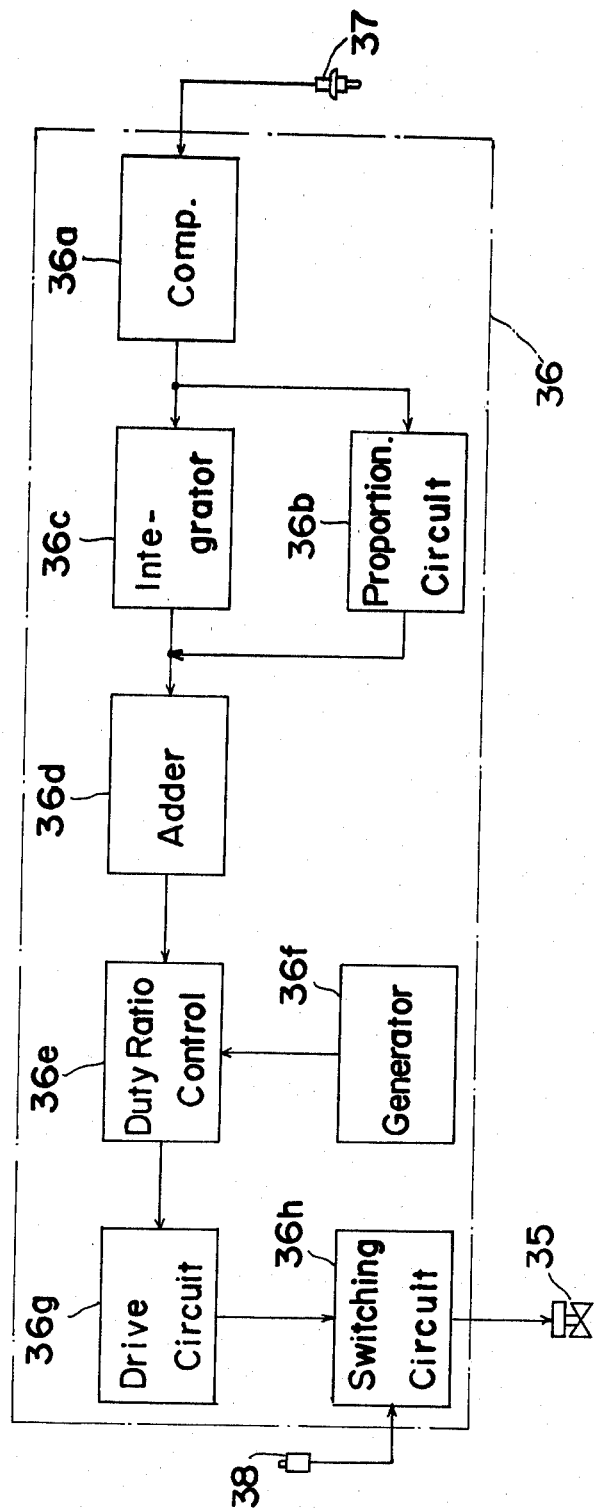
FIG. 2 is a circuit block diagram of an air-fuel mixing ratio control employed in the automobile fuel control system shown in FIG. 1.

As the warm-up of the engine progresses further and when the temperature of the cooling liquid inside the water jacket 32 attains a value equal to or higher than the second predetermined temperature which is higher than the first predetermined temperature, the second temperature sensor 38 generates the second temperature signal to the ratio control 36. When and after the second temperature signal from the second temperature sensor 38 has been applied to the ratio control 36 in the manner described above, the ratio control 36 generates an output pulse of a pulse duration determined in dependence on the output signal from the composition sensor 37 in the manner described with reference to FIG. 2. This output pulse from the ratio control 36 is applied to the control valve 35 to cause the latter to open for a period of time determined by the pulse duration of the output pulse from the ratio control 36. During the opening of the control valve 35 so effected in the manner described above, fresh air from the atmosphere is introduced into the main fuel supply passage 22 through the control air passage 34 and then through the auxiliary air passage 33, whereby the air-fuel mixing ratio of the combustible air-fuel mixture then supplied to the combustion chamber 11 is adjusted to a value substantially equal to the stoichiometric mixing ratio required for the catalytic converter 15 to work at its maximum conversion efficiency. It is to be noted that, even during the opening of the control valve 35, the exhaust gas recirculation is still taking place. Therefore, so far as the emission of the NOx components of the exhaust gases is concerned, it can advantageously be minimized not only by the effect of the exhaust gas recirculation, but also by the action of the catalytic converter 15.

Although the present invention has been described in connection with the preferred embodiment thereof with reference to the accompanying drawings, it is to be noted that various changes and modifications are apparent to those skilled in the art. By way of example, although the example wherein the two separate temperature sensors 31 and 38 has been described, the employment of a single temperature detector for generating the first and second temperature signals in succession at different times is possible as can readily be understood by those skilled in the art. In addition, as a parameter representative of the temperature of the engine, either the air being introduced into the intake passage 16 or the combustible air-fuel mixture may be utilized instead of the cooling liquid inside the water jacket 32.

Moreover, in the embodiment shown and described, the EGR system may be so designed that, during a period of time subsequent to the generation of the first temperature signal from the first temperature sensor 31, but prior to the generation of the second temperature signal from the second temperature sensor 38, a portion of the exhaust gases can be circulated back to the fuel intake system at a progressively or continuously varying flow rate. By so doing, it is possible to further improve the automobile drivability.

Yet, although it has been described that the fresh air is introduced into the main fuel supply passage 22 during the opening of the control valve 35, the control valve 35 may be used to regulate the flow of fuel through the main fuel supply passage 22.

Furthermore, although the valve casing 24 has been described as having the negative and atmospheric chambers 24a and 24b, it may have only the negative chamber 24a. In this case, the electromagnetically operated valve 30 should be a three-way electromagnetic valve having three ports communicated respectively to the intake passage 16, the negative chamber 24a and the atmosphere, and a rotor having a passage and being operable to communicate one of the ports adjacent the negative chamber 24a to another one of the ports adjacent the intake passage 16 only when the valve is energized in response to the first temperature signal from the first temperature sensor 31.

From the foregoing full description of the present invention, it has now become clear that the emission of the pollutants contained in the exhaust gases can advantageously be minimized not only during the cold start of the automobile engine, but also after the automobile engine has been warmed up.

Accordingly, such changes and modifications are to be understood as included within the true scope of the present invention, defined by the appended claims, unless they depart therefrom.

We claim:
1. In an automobile fuel control system for an automobile internal combustion engine comprising a source of combustible air-fuel mixture, a mixture intake passage means for supplying the combustible air-fuel mixture from the mixture source to the combustion engine, and exhaust passage means including a catalytic converter which provides simultaneous oxidization of unburned fuel and a reduction of nitrogen oxides, said automobile fuel control system including a composition sensor for detecting the concentration of a particular component of the exhaust gases emitted from the engine, a mixing ratio control means including a compensator for compensating for variations of the air-fuel mixing ratio of the combustible air-fuel mixture, said mixing ratio control means being operable in response to an output signal from the composition sensor to cause the compensator to operate, and an exhaust gas recirculating means including a recirculating passage for communicating the exhaust passage means to the mixture intake passage means and including a control valve means for establishing and interrupting the communication between the exhaust passage means and the intake passage means through the recirculating passage, the improvement which comprises a temperature detector for detecting the temperature of the engine and for generating a first temperature signal when the detected temperature of the engine is equal to or higher than a first predetermined value and for generating a second temperature signal when the detected temperature of the engine subsequently becomes equal to or higher than a second predetermined value which is higher than the first predetermined temperature as a result of warm-up of the engine, said control valve means being held in position to establish the communication between the exhaust passage means and the intake passage means in response to the generation of the first temperature signal, said mixing ratio control means being operated in response to the generation of the second temperature signal to cause the compensator to compensate for variations of the air-fuel mixing ratio of the combustible air-fuel mixture being supplied to the engines wherein said air-fuel mixture supplied to said engine is enriched prior to the generation of said second temperature signal when said engine is cold started.

2. In an automobile fuel control system for an automobile internal combustion engine comprising a source of combustible air-fuel mixture, a mixture intake passage means for supplying the combustible air-fuel mixture from the mixture source to the combustion engine, and exhaust passage means including a catalytic converter which provides simultaneous oxidation of unburned fuel and a reduction of nitrogen oxides, said automobile fuel control system including a composition sensor for detecting the concentration of a particular component of the exhaust gases emitted from the engine, a mixing ratio control means including a compensator for compensating for variations of the air-fuel mixing ratio of the combustible air-fuel mixture, said mixing ratio control means being operable in response to an output signal from the composition sensor to cause the compensator to operate, and an exhaust gas recirculating means including a recirculating passage for communicating the exhaust passage means to the mixture intake passage means and including a control valve means for establishing and interrupting the communication between the exhaust passage means and the intake passage means through the recirculating passage, the improvement which comprises a temperature detector for detecting the temperature of the engine and for generating a first temperature signal when the detected temperature of the engine is equal to or higher than a first predetermined value and for generating a second temperature signal when the detected temperature of the engine subsequently becomes equal to or higher than a second predetermined value which is higher than the first predetermined temperature as a result of warm-up of the engine, said control valve means being held in position to establish the communication between the exhaust passage means and the intake passage means in response to the generation of the first temperature signal, said mixing ratio control means being operated in response to the generation of the second temperature signal to cause the compensator to compensate for variations of the air-fuel mixing ratio of the combustible air-fuel mixture being supplied to the engine;
   wherein the combustible air-fuel mixture source includes a choke valve for regulating the flow of air to be mixed with a fuel, and wherein the air-fuel mixture supplied to the engine is enriched by the opening degree of the choke valve prior to the generation of the second temperature signal.

3. In an automobile fuel control system for an automobile internal combustion engine comprising a source of combustible air-fuel mixture, a mixture intake passage means for supplying the combustible air-fuel mixture from the mixture source to the combustion engine, and exhaust passage means including a catalytic converter which provides simultaneous oxidation of unburned fuel and a reduction of nitrogen oxides, said automobile fuel control system including a composition sensor for detecting the concentration of a particular component of the exhaust gases emitted from the engine, a mixing ratio control means including a compensator for compensating for variations of the air-fuel mixing ratio of the combustible air-fuel mixture, said mixing ratio control means being operable in response to an output signal from the composition sensor to cause the compensator to operate, and an exhaust gas recirculating means including a recirculating passage for communicating the exhaust passage means to the mixture intake passage means and including a control valve means for establishing and interrupting the communication between the exhaust passage means and the intake passage means through the recirculating passage, the improvement which comprises a temperature detector for detecting the temperature of the engine and for generating a first temperature signal when the detected temperature of the engine is equal to or higher than a first predetermined value and for generating a second temperature signal when the detected temperature of the engine subsequently becomes equal to or higher than a second predetermined value which is higher than the first predetermined temperature or as a result of warm-up of the engine, said control valve means being held in position to establish the communication between the exhaust passage means and the intake passage means in response to the generation of the first temperature signal, said mixing ratio control means being operated in response to the generation of the second temperature signal to cause the compensator to compensate for variations of the air-fuel mixing ratio of the combustible air-fuel mixture being supplied to the engine;
   wherein said temperature detector comprises first and second temperature sensors which generate the first and second temperature signals, respectively, at different times;
   and wherein the combustible air fuel mixture source includes a choke valve for regulating the flow of air to be mixed with a fuel, and wherein the air-fuel mixture supplied to the engine is enriched by the opening degree of the choke valve prior to the generation of the second temperature signal.

4. A control system as claimed in claim 1, wherein said temperature detector comprises first and second temperature sensors which generate the first and second temperature signals, respectively, at different times.

5. A control system as claimed in claims 1 or 4, wherein the temperature detector detects the temperature of a cooling medium flowing in a water jacket surrounding the intake passage means, the temperature of the cooling mefium being representative of the engine temperature.

6. A control system as claimed in claims 1 or 4, wherein the adjustment of the mixing ratio is effected by controlling the amount of air to be mixed with the air-fuel mixture.

* * * * *